E. C. PATTERSON.
Grain Separator.
No. 45,517. Patented Dec. 20, 1864
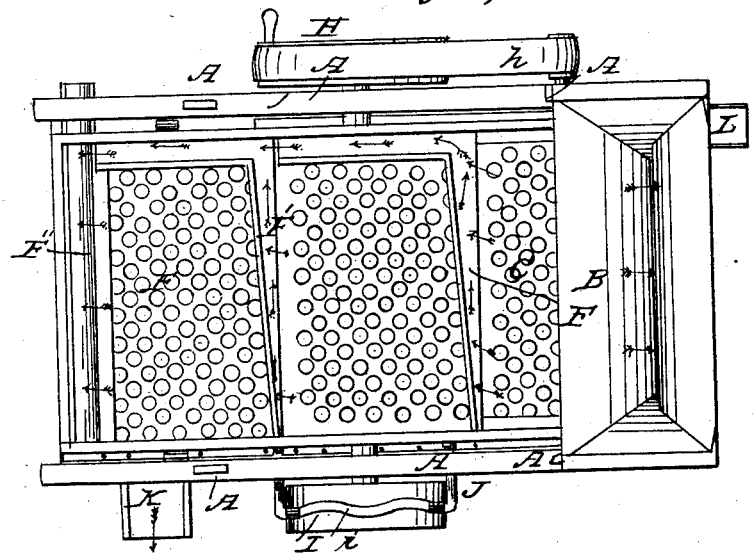
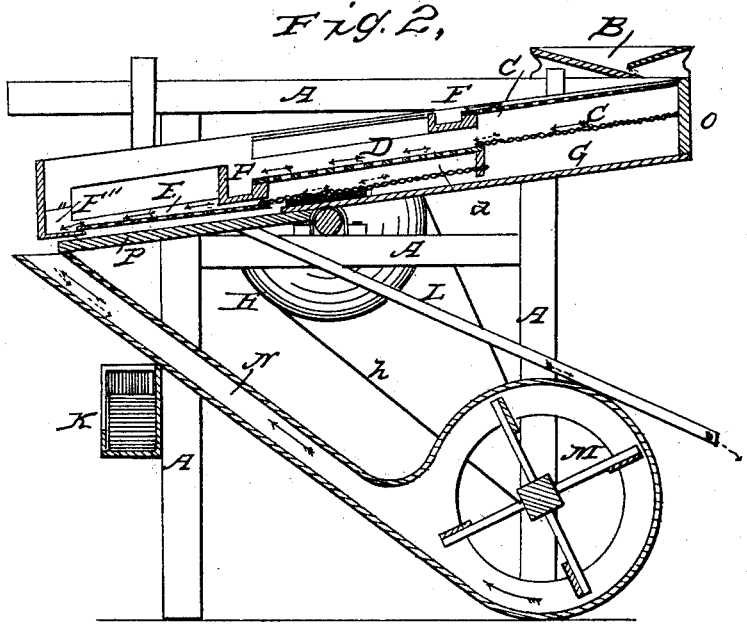
WITNESSES:
J. L. Coburn
J. J. Seler
INVENTOR:
E C Patterson
by Coburn & Maus
attorneys

UNITED STATES PATENT OFFICE.

E. C. PATTERSON, OF CHICAGO, ILLINOIS.

IMPROVEMENT IN GRAIN-SEPARATORS.

Specification forming part of Letters Patent No. 45,517, dated December 20, 1864.

*To all whom it may concern:*

Be it known that I, E. C. PATTERSON, of Chicago, in the county of Cook and State of Illinois, have invented a new and useful Improvement in Grain Separators; and I do hereby declare that the following is a full, clear, and exact description thereof, reference being had to the accompanying drawings and the letters and figures marked thereon, which form part of this specification.

In said drawings, Figure 1 represents a plan or top view of my invention, and Fig. 2 a side sectional view of the same.

Similar letters of reference in the different figures indicate the same parts of my invention.

The object of my invention is to produce a machine whereby oats and other grains may be effectually and thoroughly separated from wheat when from any cause the same may be intermingled and the latter obtained free and clear from other grains or seeds; and its nature consists in a novel arrangement of the sieves or separating-screens, to be hereinafter described.

To enable those skilled in the art to understand, construct, and use my invention, I will now proceed to describe the same with particularity, reference being made to aforesaid drawings.

A represents the frame-work of my machine, and is constructed of timber of any suitable dimensions.

B represents the hopper, into which the grain is admitted, and whence it passes to the sieves or separating-screens below. The sieves are all arranged in a frame, which is shaken by means of the cam-wheel I, which is revolved by the shaft of the wheel H, motion being communicated thereunto by hand or by any other suitable power. The same wheel H, by means of the barrel $h$, also revolves the fan or blower M. The wheel I is provided with a serpentine channel extending entirely around it, into which the arms J, attached to the sieve-frame, enter by means of the curved or bent ends, which are provided with anti-friction-rollers, as shown. By this arrangement the revolution of the wheel H imparts a regular vibratory motion to the sieve-frame, which facilitates the operation of the machine very much.

C, D, and E represent the separating-sieves, and $c$ and $d$ are wire screens whose interspaces are so small as to allow nothing but the smaller seeds to pass through, compelling the wheat and coarser grains to pass along to the separating-sieves D and E, respectfully. The perforations through the sieves C D E are of such size as will readily permit a kernel of wheat to pass through, while an oat, being longer than the wheat-kernel, cannot drop through unless it be tilted up on one end. Thus while the grain is shaken down upon the sieve C the wheat and smaller grains or seeds drop through upon the screen $c$, while nearly all of the oats and coarser grains pass over the sieve and go out through the channel or passage F, as indicated by the dark arrows. The wheat and such of the oats and coarser grains as, by reason of tilting up or otherwise passed through the first sieve C, are then shaken down upon the sieve D, where the same operation is repeated, and a large proportion of the remaining oats is separated and conveyed off through the channel F, as shown. In the mean time the grass-seed and other small seeds pass through the screens $c$ and $d$ and fall upon the inclined floor G, which is so arranged that the same pass down said floor, and, dropping through an opening therein into the spout L, are conveyed out in the rear of the machine, as shown.

The size of the interspaces in the screens $c$ and $d$ may be so adjusted that only the grass-seed should fall through $c$ and be carried out by the spout L, while the cockle-seed and other seeds of that ilk should go on and be precipitated upon $d$, passing through which it should go out by a separate spout, thus obtaining the grass seed clear. The grain having dropped upon the screen $d$, is then shaken along upon the sieve E, through which the wheat again falls, while the remainder of the oats pass on and go out of the passage F'', and from the machine, as shown by the dark arrows. This arrangement may continued to any desired extent, but a series of four sieves I consider as sufficient thoroughly to effect the desired result.

The wheat falling upon the board P passes in the direction of the red arrows into the mouth of the blast-passage, passing a short distance down said passage, and then falling through an opening therein into the spout K, whence it is conveyed into the appropriate receptacle.

The air-current created by the fan M passing up the spout N, though the wheat, effectually removes all light material which may be in it, and thus leaves the wheat perfectly free from all objectionable seeds, grains, and other substances.

If desired, the air-spout N may be constructed so as to discharge the blast beneath either or all of the sieves and screens. The advantage of my arrangement of the sieves over the ordinary arrangement of a series of sieves one above the other, among others, is this:

When the oat becomes tilted downward so as to pass through the first sieve, if all the sieves are arranged directly beneath, the probabilities are that the oat will strike endwise upon the next sieve below and pass through that also, and so on to the last; but in my arrangement, when the oat is tilted down, as described, and drops through the first sieve, instead of plunging down through the entire series and so remaining with the wheat after all, it is brought up by the screen $c$ and compelled to assume a horizontal position, in which it passes on to the next sieve, when its chances of getting through are much less than they would have been had it come down upon it head first.

Having described my invention, I will now specify what I claim as my invention and desire to secure by Letters Patent—

The combination and arrangement of the sieves C D E, the channels F F' F'', and the screens $c$ $d$, substantially as and for the purposes herein delineated and set forth.

E. C. PATTERSON.

Witnesses:
W. E. MAUS,
L. L. COBURN.